May 10, 1927. 1,627,679
T. VICARS ET AL
BISCUIT OR LIKE EMBOSSING AND CUTTING MACHINE
Filed Dec. 22, 1920 3 Sheets-Sheet 3
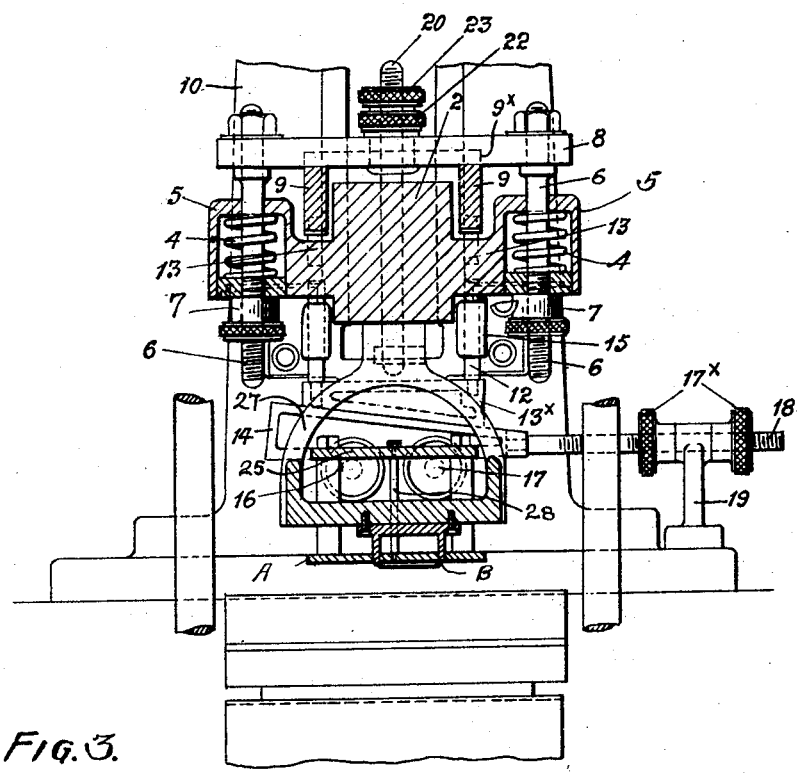
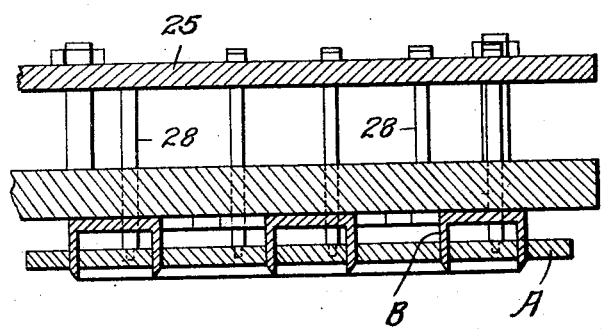
Inventors
T. Vicars
E. L. Vicars Patented May 10, 1927.

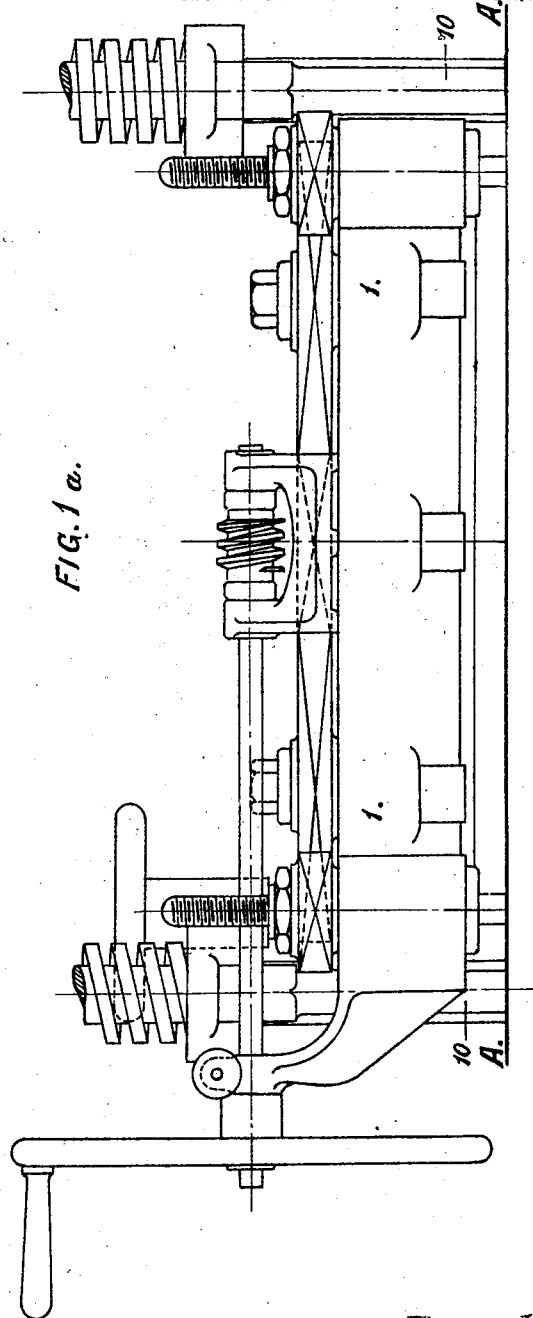

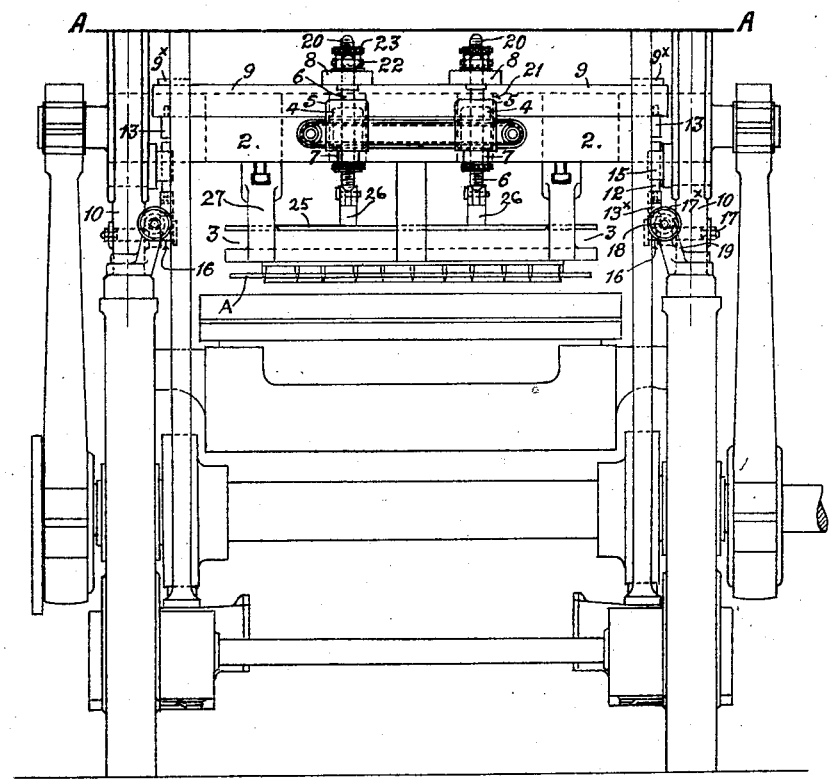

1,627,679

UNITED STATES PATENT OFFICE.

THOMAS VICARS AND EDWARD LYNTON VICARS, OF EARLESTOWN, ENGLAND.

BISCUIT OR LIKE EMBOSSING AND CUTTING MACHINE.

Application filed December 22, 1920, Serial No. 432,588, and in Great Britain June 30, 1919.

(GRANTED UNDER THE PROVISIONS OF THE ACT OF MARCH 3, 1921, 41 STAT. L., 1313.)

This invention is directed to biscuit or like embossing and cutting machines of the type shown in Patent No. 1,231,817 issued July 3, 1917, and is particularly directed to providing adjustable stops for limiting the descent of the ejectors, so that when the cutter cross head descends to the cutting point, the ejectors are held out of contact with the biscuits until the cutter cross head rises.

More specifically, the invention provides duplicate sets of wedges arranged in cooperating pairs, and manually adjustable to interrupt the descent of the ejectors at the desired point.

The invention is illustrated in the accompanying drawings, in which:

Figures 1$^a$ and 1$^b$, taken together, on the line A—A, show a front view of the machine which could not be satisfactorily shown on one sheet.

Fig. 2 is a vertical cross section of the same, illustrating more particularly the arrangement and means for operating the wedges.

Fig. 3 is a longitudinal section of the cutter and ejecting mechanism.

The improvement is particularly directed to a machine of this type, wherein side bars 9, one on each side, which support or are carried in cross plates 8, are loosely connected to the cross head 2. Rods 6 carried in the cross plates 8 pass through casings 5 fixed on the sides of the cutter head 2, and are provided with adjusting nuts 7 below the casings, tension springs 4 being arranged in the casings. The embossing cross head is indicated at 1, and the frame bars, in which the cutter cross head works, are indicated at 10. The ejector mechanism A is carried on bolts 20 which pass through slots 21 in the cross head 2, and are provided above the plates 8 with adjusting nuts 22 and lock nuts 23.

The ejector mechanism A is carried on bolts 20, through the medium of a plate 25, to which the bolts are connected by yokes 26, supplemental bolts 28 extending from the plate 25 to the ejector mechanism. Yokes 27 connect the cutters B to the cross head 2.

The above description is a brief outline of sufficient of the ordinary parts of a machine of the type to which the present invention is applied, for an understanding of the invention, the detail of which will be now described.

The bars 9 are provided with fixed depending stops 13, and cooperating therewith are stops 12 mounted at each side of the machine on the upper surface of an upper wedge member 13$^x$, having its inclined surface resting upon the similarly inclined surface of an adjustable lower wedge member, the stops 12, which are in the form of rods, being guided in hollow guides 15 secured to the insides of the frames 10.

The lower wedges 14 are supported and move on rollers 16, carried by spindles 17 secured to the frames 10, and these lower wedge members are adjusted longitudinally by appropriate operation of adjusting nuts 17$^x$ engaging a threaded spindle 18 projecting from the lower wedge member, with the adjusting nuts arranged on opposite sides of a fixed bracket 19, through which the spindle 18 loosely passes.

Obviously, by adjusting the lower wedge members, the descent of the ejectors can be limited to the extent desired through cooperation of the stops 12 and 13, and furthermore as independent wedge mechanism is provided on each side of the machine, the adjustment may be such as to permit the descent of the cross bars at an angle to the cutting table to regulate the level of the ejector plate.

To use the cutters and ejector mechanism for cutting biscuits, the ejecting bolts 20 are passed through slots 21 in the cross head 2, and screwed through the collared nuts 22 fixed on the bridges 8, and then the upper wheel nut 23 is screwed in position onto the end of the bolts 20; and the ordinary cutters B being placed in position and secured to the cross head 2, they are lowered into the cutting position with the ejecting plates resting on the cutting web. When in this position, the lower end of the nut 22 should rest on the cross head 2, and then by means of this nut the ejecting plate should be raised about a quarter of an inch away from the cutting web table; and then they are locked in this position by means of the lock nuts 23 on the top of the nuts 22.

The spring adjusting cross plates 8 are set so that there is say a space of about three eighths of an inch between the nut bottom of the nut 22, and the cross head 2, whereupon the rods 12 are so adjusted as to be in touch with the tips of the stops 13 on the bars 9.

In this condition the springs 4 are placed in position and compressed by screwing up the nuts 7 on the rods 6 until they are say in this case, nine sixteenths of an inch shorter than when fully extended, and remain in this state, when the ordinary cutters are out of gear, and the embossing cutters are being used on the machine.

On each end of the cross bars 9 a distance piece 9× is provided, which prevents them from approaching the cross head 2 nearer than is desirable.

Claims:

1. In a biscuit embossing and cutting machine, a movable cross head for operating the cutters, ejectors, bars carrying said ejectors and adapted to be operated by the cross head, and adjustable wedge mechanism to limit the descent of said bars in the movement of the cross head.

2. In a biscuit embossing and cutting machine, a movable cross head, ejectors, bars carrying said ejectors and adapted to be operated in the movement of the cross head, tension springs providing a yielding connection between said bars and cross head, stops connected with said bars, cooperating stops movable in the frame of the machine, and wedge members to actuate said latter stops to limit the descent of said bars.

3. In a biscuit embossing and cutting machine, a movable cross head, ejectors, bars carrying said ejectors and adapted to be operated in the movement of the cross head, tension springs providing a yielding connection between said bars and cross head, stops connected with said bars, cooperating stops movable in the frame of the machine, wedge members to which said cooperating stops are connected, and adjustable wedge members cooperating with the first mentioned wedge members to move the same and thereby the cooperating stops to determine the descent of said bars.

4. In a biscuit embossing and cutting machine, a movable cross head, ejectors, bars carrying said ejectors and adapted to be operated in the movement of the cross head, tension springs providing a yielding connection between said bars and cross head, stops connected with said bars, cooperating stops movable in the frame of the machine, and wedge members arranged in cooperating pairs at each side of the machine to actuate the cooperating stops to limit the descent of the bars.

5. In a biscuit embossing and cutting machine, a movable cross head, ejectors, bars carrying said ejectors and adapted to be operated in the movement of the cross head, tension springs providing a yielding connection between said bars and cross head, stops connected with said bars, cooperating stops movable in the frame of the machine, and wedge members arranged in cooperating pairs at each side of the machine to actuate the cooperating stops to limit the descent of the bars, each pair of wedge members being independently adjustable to thereby vary the descent of each side of the ejectors at will to regulate the level of the ejectors.

In testimony whereof we have signed our names to this specification.

THOMAS VICARS.
E. LYNTON VICARS.